April 9, 1963     H. E. DARLING     3,085,208
ELECTRICAL RATIO CONTROL MAGNETIC AMPLIFIER
Filed Sept. 15, 1958
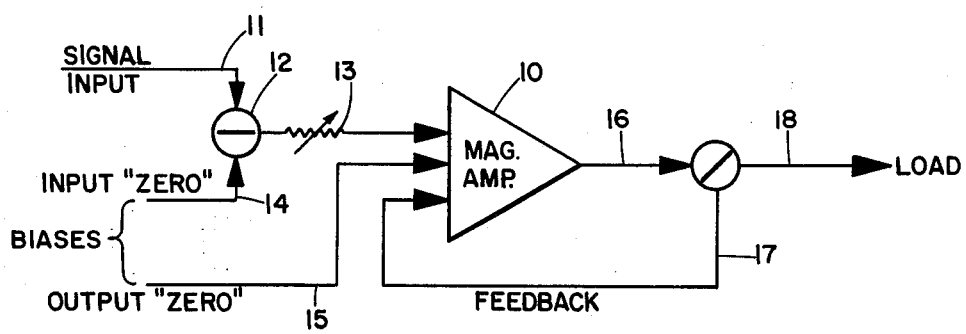
FIG. I
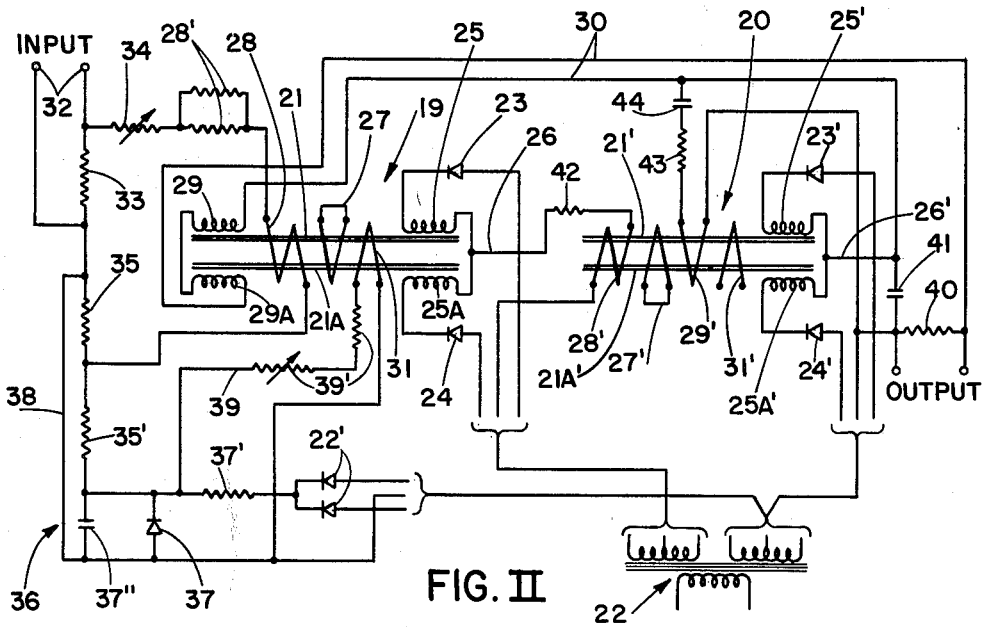
FIG. II
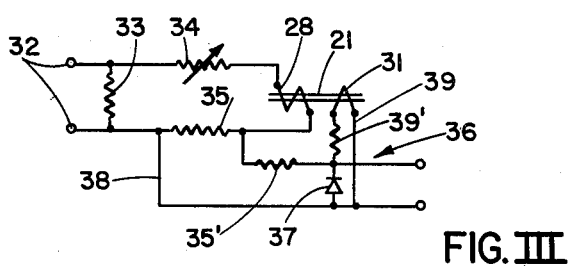
FIG. III
*INVENTOR.*
HORACE E. DARLING
BY
Lawrence H. Dalton
AGENT

United States Patent Office 3,085,208
Patented Apr. 9, 1963

3,085,208
ELECTRICAL RATIO CONTROL MAGNETIC AMPLIFIER
Horace E. Darling, North Attleboro, Mass., assignor to The Foxboro Company, Foxboro, Mass., a corporation of Massachusetts
Filed Sept. 15, 1958, Ser. No. 761,136
1 Claim. (Cl. 330—8)

This invention is in the field of industrial instrumentation and is particularly concerned with ratio control of electrical signals in representation of variable condition values.

The device of this invention is a direct current amplifier, i.e. a precision direct current transformer in the form of a magnetic amplifier.

Industrial instrumentation devices as a practical matter operate over ranges which start at elevated values. In pneumatic controls for example, a zero to X variable condition range is customarily handled as a three to fifteen pound pressure operating range.

The device of this invention is concerned with electrical control instrumentation. Thus a simulation of this pneumatic control range is necessary. The application of input and output biases to amplifiers using tubes or semiconductors is found to be a difficult and involved procedure because of interaction between the different parts of the circuitry.

However, the device of this invention, through the use of a magnetic amplifier, is able to readily establish such biases in individual circuits and on a simple basis, for example, two separate bias conditions from a single bias source.

One of the building blocks useful in electronic systems is a precision amplifier-attenuator whose input and output direct currents bear an accurate ratio to each other. Such a device is required to accept a direct current from a measuring system and to deliver at its output a direct current whose magnitude is related to the input current by a manually adjustable ratio. For each ratio setting, the output current is required to be independent of moderate temperature changes, load resistance, and power supply voltage. In effect, the device desired is a direct current transformer of continuously adjustable transformation ratio, independent of external conditions, and having an output which approaches a constant current source.

An industrial application of the ratio amplifier is found in the problem of flow ratio control using all-electronic control systems. The ratio amplifier may be inserted between a direct current transmitter for a flow system No. 1 and an electronic controller. This permits a continuously adjustable amplification or attenuation at the will of the operator, of the flow signal transmitted by system No. 1 to the controller, relative to a second flow signal of system No. 2 of the process. The problem of adjusting the blending proportions of two components of a process is simplified by the use of the ratio amplifier.

As is well known from feedback amplifier theory, a high current gain magnetic amplifier with a large amount of degenerative current feedback tends to be immune to temperature, load resistance, and supply voltage, or any other factor which affects the internal gain of the amplifier. In principle, the desired current ratio could be achieved by varying the amount of feedback, but this poses problems in amplifier stability. This invention provides a stable, constant gain magnetic amplifier wherein the input is attenuated through the range desired by means of a precision variable resistor.

It is therefore an object of this invention to provide a new and improved electrical ratio control system.

Other objects and advantages of this invention will be in part apparent and in part pointed out hereinafter.

In the drawings:

FIGURE I is a simplified schematic illustration of a system according to this invention;

FIGURE II is a circuit diagram of a two stage magnetic amplifier in illustration of this invention; and FIGURE III is a simplified circuit showing of a part of the circuit of FIGURE II, illustrating input and output bias circuits.

The FIGURE I simplified schematic circuit in illustration of this invention comprises a magnetic amplifier unit 10 to which a variable condition signal is applied through an input 11, a differencing arrangement 12, and an adjustable ratio variable resistor 13. The input zero bias is supplied to the device 12 through means indicated at 14. In independent circuitry, an output bias is applied to the magnetic amplifier 10 through means indicated as at 15. The output of the magnetic amplifier is indicated at 16 and a feedback 17 is taken therefrom and applied to the magnetic amplifier 10. The load on this device is indicated as at 18 associated with the magnetic amplifier output 16.

The signal input as at 11, FIGURE I, comprises the variable condition value from true zero to 100% transduced to an elevated signal input, for example, 10 to 50 ma. In the differencing arrangement 12, the signal input is biased to true zero so that when the variable condition is at zero percent and the input signal is at the minimum elevated value of 10 ma., the ratio input signal applied to the ratio resistor 13 and consequently the amplifier input signal applied to the amplifier 10, is true zero. However, the amplifier is also biased, as through the means indicated at 15, FIGURE I. This is an output bias and results in an elevated output signal value (at 16) as an output signal minimum. The amount of the output bias may be such as to result in an output signal minimum at 10 ma.

Thus when the variable condition is at true zero, the input signal (11) at the input bias point (12) is 10 ma., the ratio input signal is zero, the amplifier input signal is zero, and the output signal is 10 ma. Accordingly an input signal of 10 to 50 ma. results in an output signal of 10 to X ma. while the amplifier itself operates on the basis of 0 to X.

The amplifier is linear, and with the system of this invention, the ratio adjustment and the biasings do not affect this linearity. Thus the output of this device is always proportional with respect to the actual value of the variable condition.

The FIGURE II circuit by way of illustration of this invention consists of two stages of self-saturating magnetic amplification in cascade, the first stage being generally indicated at 19 and the second stage at 20. The first stage 19 comprises a pair of matched magnetic cores 21 and 21A with several separate and independent coil windings thereon. Exciting windings for this first stage are supplied from an A.C. source 22 through rectifier members 23 and 24 to exciting coils 25 and 25A on the cores 21 and 21A respectively. The output lead to the second stage 20 from the first stage 19 is indicated at 26 and is taken off the common junction of the exciting coils 25 and 25A. A short-circuited winding 27 is also provided, which links both the cores 21 and 21A, and constitutes a low impedance path for the flow of second harmonic signals. It further decouples the input stage from the measuring system and results in a higher current gain than possible with conventional decoupling means.

An input signal coil 28 is also provided on the first stage and links both magnetic cores 21 and 21A. Another pair of coils 29 and 29A is used as a means of applying feedback from the output of this whole device to the first stage 19 of the amplifier through feedback leads 30. Finally, an output bias coil 31 is provided, linking the cores 21 and 21A.

The signal input to the first stage 19 is direct current applied across input terminals 32. The input circuit includes essentially a parallel, voltage establishing resistor 33, a series, variable, ratio set resistor 34, a bucking voltage applying bias resistor 35 in series arrangement, and the input signal coil 28. Resistors 28' in series with the ratio set 34, are temperature sensitive, and are for the purpose of neutralizing copper winding resistance change with temperature.

A bias system is indicated generally at 36 with a Zener diode regulator, indicated at 37. Power for the regulator system is obtained from the transformer 22, converted to D.C. by the rectifier 22', and supplied to the regulator diode 37 and its associated load through a current limiting resistor 37'. A capacitor 37'' is used to provide a moderate amount of filtering. The diode 37 supplies a constant voltage at its terminals.

The load on the bias system is divided into two separate circuits. The circuit indicated at 38 consists of two precision resistors 35 and 35' in series, forming a fixed voltage divider, with relative values of the resistors 35 and 35' being selected to supply the required bucking voltage across resistor 35 to bias the input signal. A second circuit indicated at 39 provides bias current through limiting resistors 39' to the bias winding 31 encircling cores 21 and 21A of amplifier stage 19. The current level through coil 31 adjusts the output level of the two stages 19 and 20 in cascade.

In this connection FIGURE III is a simplified illustration of the biasing arrangements to demonstrate the individual and separate circuit arrangements, wherein the circuit 38 is an input signal bias on a voltage basis and the circuit 39 is an output signal bias on a current basis. Thus a simple and inexpensive arrangement is provided for establishing the double bias condition of this overall system and it provides this bias from a single source and by applying to the input a small voltage and to the output a small current. This is an important part of this invention since the input current must be biased to an actual zero input to the amplifier at a signal value which is predetermined, for example 10 milliamps. on the basis of a 10 to 50 milliamp. operating system.

The output of the first stage 19 flows through a resistor 42, which adjusts the interstage circulating current to the bias level required for the output stage 20.

The second stage 20 of the overall magnetic amplifier system is similar to that of the first stage 19 in that it is provided with a series of coils on cores 21' and 21A'. These coils include the input signal 28', a short-circuited winding 27', a feedback signal coil 29', an output bias signal coil 31', and exciting coils 25' and 25A'.

The output of the second stage is indicated as at 26' and is applied across a resistor 40, representing an external load, and across the feedback windings 29 and 29A in series. A filter condenser 41 is used to smooth the output current.

Winding 29' in the second stage 20 provides derivative feedback to stabilize the amplifier when the overall feedback loop through the leads 30 is closed. Derivative feedback is accomplished by a resistor 43 and a capacitor 44 in series with the feedback winding, and all connected across the output load. Adjusting this resistor changes the phase shift of the amplifier to low frequency signals over wide limits, and by properly polarizing the feedback winding, counteracts any tendency of the amplifier to hunt. The amount of derivative feedback necessary is related to the time constant of the amplifier.

Thus this device is an electrical ratio control in the form of a direct current magnetic amplifier and may be considered as a direct current transformer.

This invention by virtue of negative current feedback, provides a device with a constant current output characteristic, being independent of the actual load resistor used over a wide range. It is a constant gain magnetic amplifier with independently biased input and biased output in combination with a variable transformation ratio device in the input.

Since no control current is flowing at input "zero," the ratio adjustment causes no change of output level for this condition.

Thus a combination is provided of "zero" biasing plus means for varying the control current at other levels of the input signal. This device accordingly lends itself to use in a signal transmission system wherein the input signal varies between two limits which do not bracket the zero current condition.

A typical ratio amplifier according to this invention can achieve the following performance characteristics in terms of percent of full scale:

(1) Zero drift: +0.0047% per ° F.
(2) Span change: 0.0028% per ° F.
(3) Repeatability: ±0.05%.
(4) Load change ±10% from 600 ohms: ±0.03% error.
(5) Zero stability with ratio set position: ±0.05% maximum error.
(6) Transformation ratio 3:1 to 1:3, continuously adjustable.

The amplifier is a true variable transformation ratio direct current transformer. It is also an excellent constant current source.

The following is an example of the structure of this device:

The input stage uses toroidal cores of 3 mil Hy-mu 80 tape. This magnetic material has the property of being sensitive to very small magnetizing forces, yet has a moderately square hysteresis loop required for good current gain. Two cores are used, and a full-wave self-saturating magnetic amplifier employed. Each core is first wound with a gate winding of 1320 turns 25 and 25A, and directly over it, but insulated from it, an additional winding of 90 turns, 29 and 29A. The two cores were then placed together and three insulated windings of 1000, 500, and 7 turns are then wound over the two cores for control (28), bias (31), feedback (29 and 29A) and D.C. coupling use (27).

The two 90-turn windings 29 and 29A are connected as series additive to form the current feedback circuit. Thus, all the load current flows through this winding to produce the required degree of degenerative current feedback. Since all the output current flows through the feedback winding, copper resistance changes of this winding with temperature cannot appreciably alter the feedback ratio, and a highly stable amplifier, independent of temperature, and approximating a constant current source results. It should be noted that feedback is actually accomplished as a flux balance in the cores of the input stage magnetic amplifier.

The input error signal is applied to the 1000-turn winding (28).

The remaining 500-turn winding (31) is used for bias which is required for linear operation of this stage, and is also the output level set for output of the amplifier.

The second stage utilizes two cores of 4 mil Orthonol tape. This material has a very high saturating flux density and a very nearly square hysteresis loop, allowing high power and current gains to be achieved. A full-wave self-saturating amplifier is also used in this stage. The cores are first wound with 2850 turns for the gate windings 25' and 25A' and after placing the two cores together, three insulated control windings of 200 (28'), 500 (31'), and 1000 (29') turns are wound over the two cores. As a final winding, seven turns of No. 22 copper wire 27' are wound over the entire unit, and the ends short-circuited to provide decoupling between the first and second stages.

The output of the first stage was connected to the 200-turn winding 28′ of the second stage through a 10-ohm series resistor 42, which may be used as a gain adjustment.

The 500-turn winding 31′ of the second stage can be used for bias, as is the first stage winding 31, but bias for this second stage is preferably obtained from the interstage circulating current.

The remaining 1000-turn winding 29′ of the output stage is used for derivative feedback to stabilize the amplifier when the over-all feedback loop is closed.

Silicon diodes are used throughout in order to minimize the temperature effects commonly associated with rectifiers.

This invention provides the combination of a magnetic amplifier with a large feedback and variable transformation ratio means in the input to the amplifier, wherein small input bias on a voltage basis and small output bias on a current basis are provided in individual circuits from a single source. The amplifier itself is a linear device with an operating range of 0 to X which varies with ratio change without detracting from the linearity of the amplifier.

The signal input to the system is elevated, for example, 10 to 50 ma. The output from the system is also elevated, for example, 10 to X ma., with the value of X depending on the ratio adjustment of the amplifier. Biasing is used on the input to make the amplifier range actual zero to X and maintain linearity, and biasing is used on the output to match the input range elevation. The result is output signals made proportional to the actual variable condition signals as transduced to an elevated range, this result being achieved by a stable variable transformation ratio magnetic amplifier.

This invention therefore provides a new and improved electrical control system unit in the form of a magnetic amplifier with biased input and biased output in combination with a variable transformation ratio device which is compatible with stability.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A magnetic amplifier all electric system for direct current amplification on a linear, stable, and variable transformation ratio basis in an industrial control instrument system of interchangeable units wherein each unit is designed to operate over the same predetermined and elevated range in response to variable condition signal changes from 0 to 100%, said system comprising, in combination, a magnetic amplifier, a stabilizing fixed and independent feedback in said amplifier, means for applying a voltage subtractive input level reference to said amplifier to establish actual zero input to said amplifier in response to a predetermined minimum input signal to said system, said amplifier including a magnetic core unit, said system including an input signal direct current circuit having a pair of input leads and a separate winding on said core unit, a variable resistance in series in one of said input leads as a transformation ratio adjustment device, said input level reference means including a parallel resistance across said input leads, a reference resistance in series in the other one of said input leads and a voltage source connected across said reference resistance, whereby the voltage appearing across said series reference resistor opposes said predetermined minimum input signal to establish said actual zero input, an individual output signal bias circuit including another separate winding on said magnetic core unit, and connection means for applying an output level individual bias current to said other separate winding from said voltage source to match said above zero minimum input signal when said actual zero input exists, energizing and output circuit means for said device, and a stabilizing fixed feedback circuit from the output of said device including still another separate winding on said unit and independent of said ratio adjustment device and said input and output level reference and bias circuits, said variable transformation ratio resistance being adjustable without change in the output of said system when and while said minimum input signal occurs with the resultant actual zero input to said amplifier.

References Cited in the file of this patent

UNITED STATES PATENTS

| | | |
|---|---|---|
| 2,338,423 | Geyger | Jan. 4, 1944 |
| 2,677,099 | Rau | Apr. 27, 1954 |
| 2,700,130 | Geyger | Jan. 18, 1955 |
| 2,704,823 | Storm | Mar. 22, 1955 |
| 2,730,574 | Belsey | Jan. 10, 1956 |
| 2,858,380 | Deise | Oct. 28, 1958 |
| 2,882,352 | Rote | Apr. 14, 1959 |
| 2,903,523 | Toomim et al. | Sept. 8, 1959 |
| 2,931,577 | Bullen | Apr. 5, 1960 |
| 2,945,218 | Markow | July 12, 1960 |